United States Patent [19]

Blum et al.

[11] Patent Number: 4,699,001
[45] Date of Patent: Oct. 13, 1987

[54] DEVICE FOR TESTING THE CORRECT FUNCTIONING OF A SLIP-CONTROLLED BRAKE SYSTEM

[75] Inventors: Klaus-Dieter Blum, Kelkheim; Wolfgang Schmitt, Villingen-Schwenningen, both of Fed. Rep. of Germany

[73] Assignee: Alfred Teves GmbH, Frankfurt am Main, Fed. Rep. of Germany

[21] Appl. No.: 9,009

[22] Filed: Jan. 28, 1987

Related U.S. Application Data

[63] Continuation of Ser. No. 773,421, Sep. 6, 1985, abandoned.

[30] Foreign Application Priority Data

Sep. 11, 1984 [DE] Fed. Rep. of Germany ....... 3433254

[51] Int. Cl.$^4$ .............................................. G01L 5/28
[52] U.S. Cl. ...................................................... 73/121
[58] Field of Search ........................ 73/121, 128, 129; 340/52 B; 324/73 R

[56] References Cited

U.S. PATENT DOCUMENTS

| | | | |
|---|---|---|---|
| 3,872,720 | 3/1975 | Fleagle et al. | 73/121 |
| 3,911,392 | 10/1975 | Fleagle | 340/52 B |
| 4,049,325 | 9/1977 | Reinecke | 340/52 B |
| 4,085,979 | 4/1978 | Leiber et al. | 73/121 |
| 4,192,180 | 3/1980 | Gerstenmeier et al. | 73/121 |
| 4,252,014 | 2/1981 | Ruof | 73/129 |
| 4,340,935 | 7/1982 | Anlauf et al. | 73/121 |
| 4,567,756 | 2/1986 | Colborn | 73/116 |

FOREIGN PATENT DOCUMENTS 2019585 10/1979 United Kingdom .

OTHER PUBLICATIONS

Misco Brochere, Fall 1984.

Primary Examiner—Stewart J. Levy
Assistant Examiner—Robert R. Raevis
Attorney, Agent, or Firm—James B. Raden; Robert P. Seitter

[57] ABSTRACT

A device for testing the correct functioning of a slip-controlled brake system is connected to the electric signal and control lines of the brake system by means of a multiconductor plug (2) instead of a central electronic controller pertaining to the brake system. The individual testing operations are initiated one after the other from a control panel or manual control unit (1) by means of a test step switch (11). Disposed in immediate proximity to the multiconductor plug (2) or combined with the latter in a single unit is a shell (3) containing electric or electronic switches or circuits (5,6,7) which can be switched over by means of signals triggered from the control unit (1) for carrying out the testing operations.

2 Claims, 3 Drawing Figures

DEVICE FOR TESTING THE CORRECT FUNCTIONING OF A SLIP-CONTROLLED BRAKE SYSTEM

This application is a continuation of application Ser. No. 773,421, filed Sept. 6, 1985, now abandoned.

BACKGROUND OF THE INVENTION

The present invention relates to a device for testing the correct functioning of a slip-controlled brake system, which can be connected to the electric signal and control lines of the brake system by means of a multiconductor plug rather than a central electronic controller pertaining to the system, which logically combines and processes the electric measuring signals, such as wheel rotation signals, and which generates electric braking pressure control and monitoring signals. The device comprises a control panel or manual control unit connected with the multiconductor plug by way of a conductor bundle.

A device of this type is described in DE-OS 28 41 211. When this known tester is used, the disconnecting of a multiconductor plug causes the connections between the central electronic controller and the signal or control lines leading to the sensors and braking pressure control valves to be interrupted. In this case the tester is not connected to the controller or is connected into the electric circuits between the controller and the other parts of the brake system.

The known tester connected to the brake system instead of the controller contains signal generators and manually actuatable switches serving to energize the braking pressure control valves (for testing the correct functioning) which requires supply of relatively high currents of several amperes with sufficiently quick response and defined pulse frequency. The disadvantage is that at least the contacts and semiconductor switches in the tester needed for testing the valve functions must be designed as circuit breakers and that the wires in the connecting cable must have a relatively large cross-section. This in turn impairs the ease of operation of the tester and requires comparatively high manufacturing costs.

The object of the present invention, therefore, is to overcome the disadvantages described and to develop a device which can be manufactured at a favorable cost and which is particularly easy to operate.

SUMMARY OF THE INVENTION

This object is achieved by an improvement of a device of the type initially referred to with the improvement being that a separate shell is arranged between the multiconductor plug and the conductor bundle leading to the control panel which contains electric or electronic switches in the form of relays, transistors, thyristors, electric amplifier circuits, or the like. For carrying out the testing operations, the switches are switched over by means of signals triggered from the control panel or manual control unit.

In an advantageous embodiment, the multiconductor plug is designed as an integral part of the shell. However, it is also possible to arrange the shell in immediate proximity to the multiconductor plug, with the connecting cable between the two being very short.

According to an advantageous embodiment of the present invention, semiconductor devices are provided in the shell as switches, which are in contact with the shell wall in a heat-conducting relationship therewith. Furthermore, it is possible to include in the conductor bundle not only signal lines for controlling the switches arranged in the shell, but also measuring lines connected directly with the contact pins of the multiconductor plug. The control panel or manual control unit of the device according to the present invention expediently contains a test step switch with a minimum of 15 switch positions. Depending on the number of testing operations desired, the number of existing switch positions can also be increased considerably. Electric measuring instruments can be built into or connected to the control panel for measuring the internal resistance and/or potential difference in the network switched on at any moment—depending on the switch position of the test step switch at such moment.

By placing the components necessary for testing inside the shell in immediate proximity to the plug, the construction in accordance with the present invention is simplified and the volume as well as the weight of the test device is decreased. As connecting cable, a comparatively thin and flexible cable is sufficient, which may also be relatively long. Thus, the handling of the test device is considerably facilitated, because the user of the device can move about easily with the manual control unit and, for example, can carry out testing operations from the driver's seat. Thus, a second person or other help for carrying out the testing operations is not required.

BRIEF DESCRIPTION OF THE DRAWING

Further features, advantages, and applications of the present invention can be taken from the following description of one embodiment with reference to the accompanying drawings wherein.

DETAILED DESCRIPTION

Figure 1:
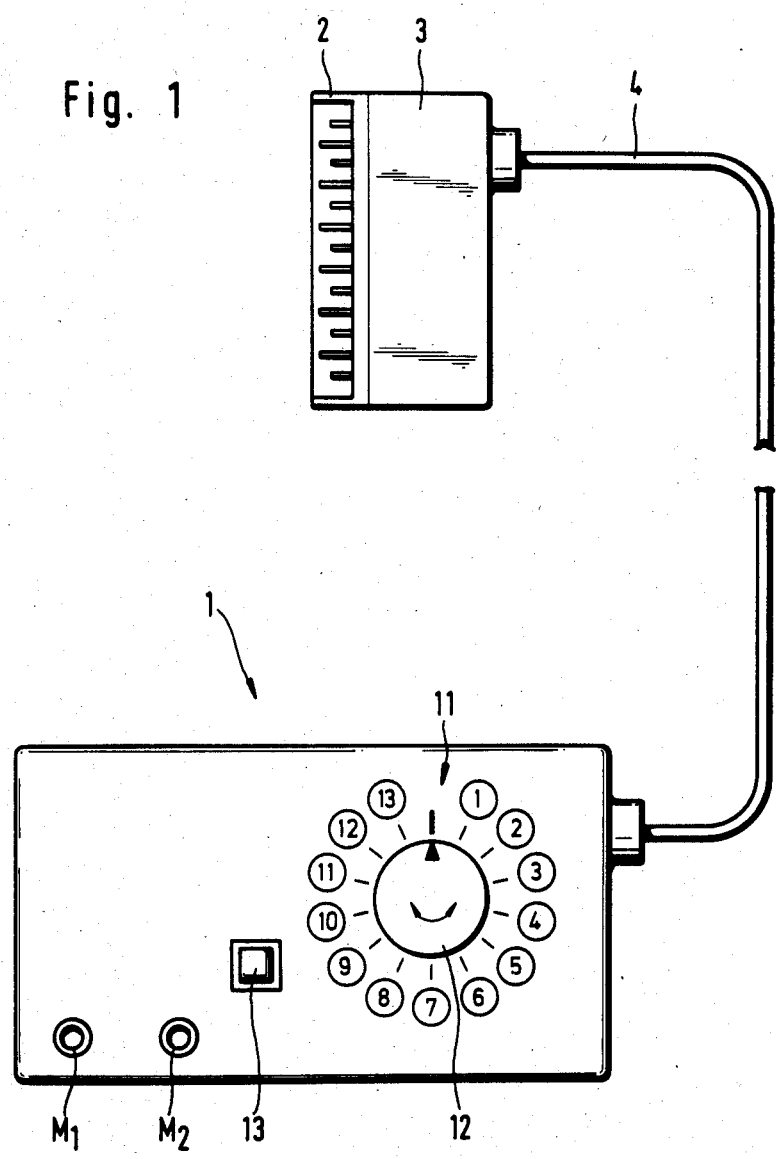
FIG. 1 is an external view of a device of the type proposed by the invention.

As illustrated in FIG. 1, the device as proposed by the present invention substantially comprises a control panel or manual control unit 1, a multiconductor plug 2, and a shell 3 which is connected with the control panel 1 by means of a conductor bunch 4 serving as connecting cable. In the embodiment shown here as an example, the multiconductor plug and the shell 3 are assembled to form one unit so that a connecting cable between the plug and the shell, through which the full switch and test current load would have to flow, is unnecessary. Under certain circumstances, however, it might be favorable to construct the additional shell 3 separate from the multiconductor plug 2 while connecting both parts with a short cable.

Figure 2:
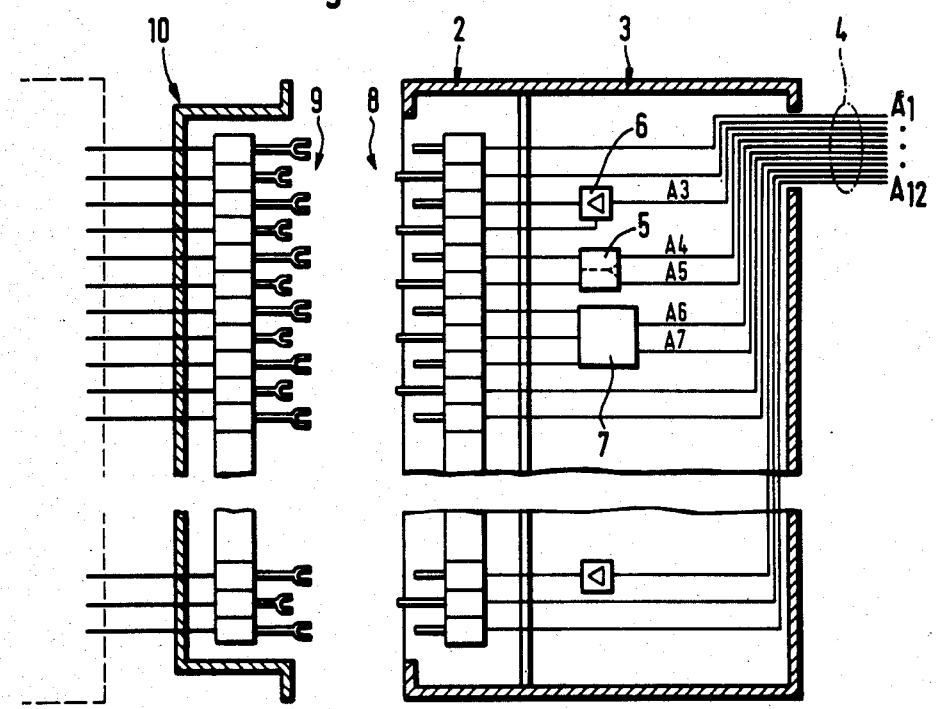
FIG. 2 provides an enlarged sectional view of the multiconductor plug of the device as shown in FIG. 1; and, FIG. 3 illustrates the basic circuit diagram of a step switch of the control panel as shown in FIG. 1.

The shell 3 combined with the multiconductor plug 2 contains relays and/or, as symbolically shown in FIG. 2, semiconductor switches 5, amplifiers 6, and electronic circuitry 7, permitting by means of low-energy control signals to switch on, switch off, or switch over to another line even a high-power load.

The counterpart of the multiconductor plug 2, i.e. the receptacle 10 containing the female contacts 9 for receiving the contact pins 8, is also indicated in FIG. 2. When the brake is in normal operation, the receptacle 10 is connected by way of a plug (not shown) corresponding to the multiconductor plug 2, with the controller of the brake system (not shown). For checking or testing the correct functioning of the brake system, the plug-in connection between the brake system and the controller is separated and instead of the controller the multiconductor plug 2 is inserted in the female contacts 9.

The circuit control lines A3 through A7 connected with the switches and circuits 5, 6, 7 inside the shell 3 and leading out of the shell 3 are rated for signal current loads only. They are combined with several brake system measuring lines (for example, A1, A2, A8, A9) leading directly to contact pins of the plug 2 in the connecting cable or conductor bunch 4 and lead to matching contacts (A1 ... A12) at the control panel 1.

Figure 3:
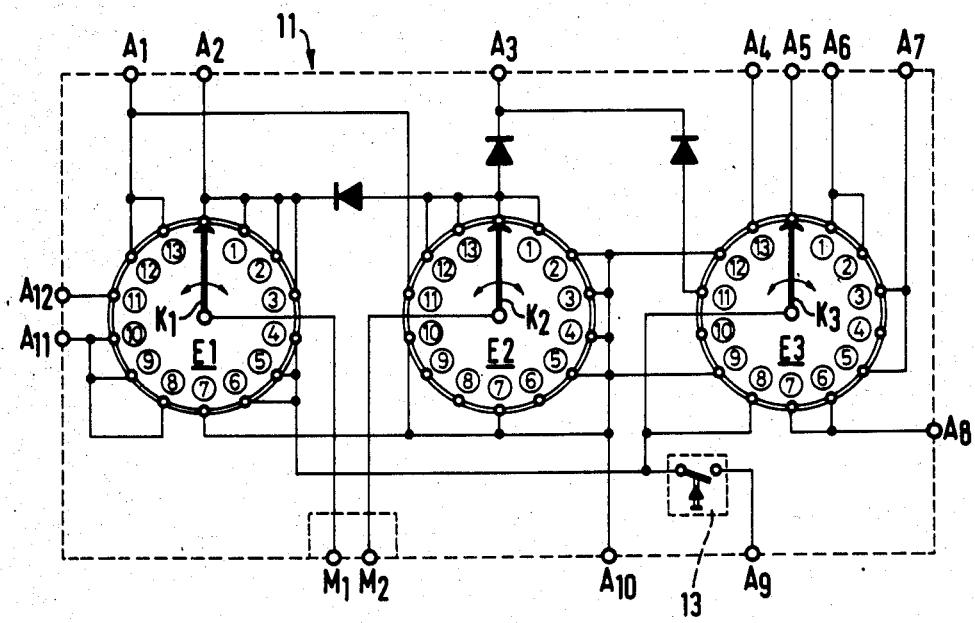

A comparison of FIG. 1 with FIG. 3 shows that in the embodiment of the invention illustrated here by way of example, a step switch 11 with for instance 14 switch positions as illustrated is suitable for setting the various test positions.

By turning the control knob 12 for step-by-step adjustment of the switch 11, the contact makers $K_1$, $K_2$, $K_3$ arranged one above the other in three levels $E_1$, $E_2$, $E_3$, which are shown side by side in FIG. 3 for illustration of the circuit diagram, are set by way of a common rotation axis to a different switch position and thus a different signal path determined by the wiring of the contacts at the rim of the contact disks $E_1$, $E_2$, $E_3$ is selected in each step.

The sockets $M_1$, $M_2$ of the control unit 1 are provided for connection of a multiple measuring instrument which depending on the switch position of the test step switch 11, permits checking of the internal resistance of the connected network or the voltage applied or voltage difference. By way of a contact A9 an external energy source, for example, the car battery, or by way of the conductor bundle 4 an energy source disposed in the shell 3 or in the car could be connected. Accordingly, when the step switch 11 is properly set and a push switch 13 is actuated, a control signal can be fed into the network connected at that given moment. Such signal could, for instance, trigger a testing operation or trip a specific relay.

What is claimed is:

1. An extra-vehicular electrical testing device adapted to connect to the electrical circuitry of an on-board vehicular braking system having an on-board disconnectable electrical connector adapted to connect said braking system to an on-board brake controller system, said testing device comprising:

an extra-vehicular electrical connector adapted to be connected to said on-board connector when the latter is disconnected from said on-board controller system, whereby to temporarily connect said extra-vehicular testing device to said on-board braking system;

extra-vehicular electrical brake testing circuitry adapted for testing said on-board braking system without the aid of said on-board brake controller system, and means connecting said brake testing circuitry to said extra vehicular electrical connector;

housing means enclosing said extra-vehicular electrical connector and said extra-vehicular brake testing circuitry, said extra-vehicular brake testing circuitry comprising testing electronic devices, including circuit breakers, said electronic circuitry located inside said housing means in close proximity to said extra-vehicular electrical connector;

extra-vehicular electrical control circuitry including manually operable switch means adapted to select the sequence of operations of said extra-vehicular brake testing circuitry;

separate housing means enclosing said extra-vehicular control circuitry;

and a relatively small cross-section control cable operatively connecting said extra-vehicular control circuitry to control said extra-vehicular brake testing circuitry.

2. The extra-vehicular electrical testing device according to claim 1, wherein the extra-vehicular brake testing circuitry comprising electronic devices includes semiconductor devices used as switches which are in contact with the housing wall of said housing means in a heat-conducting relationship;

said semi-conductor devices selected from the group including relays, transistors, thyristors, and electric amplifier circuits.

* * * * *